Dec. 3, 1968 R. L. KNOX 3,414,823
PHASE SENSITIVE DEMODULATOR
Filed Jan. 7, 1965
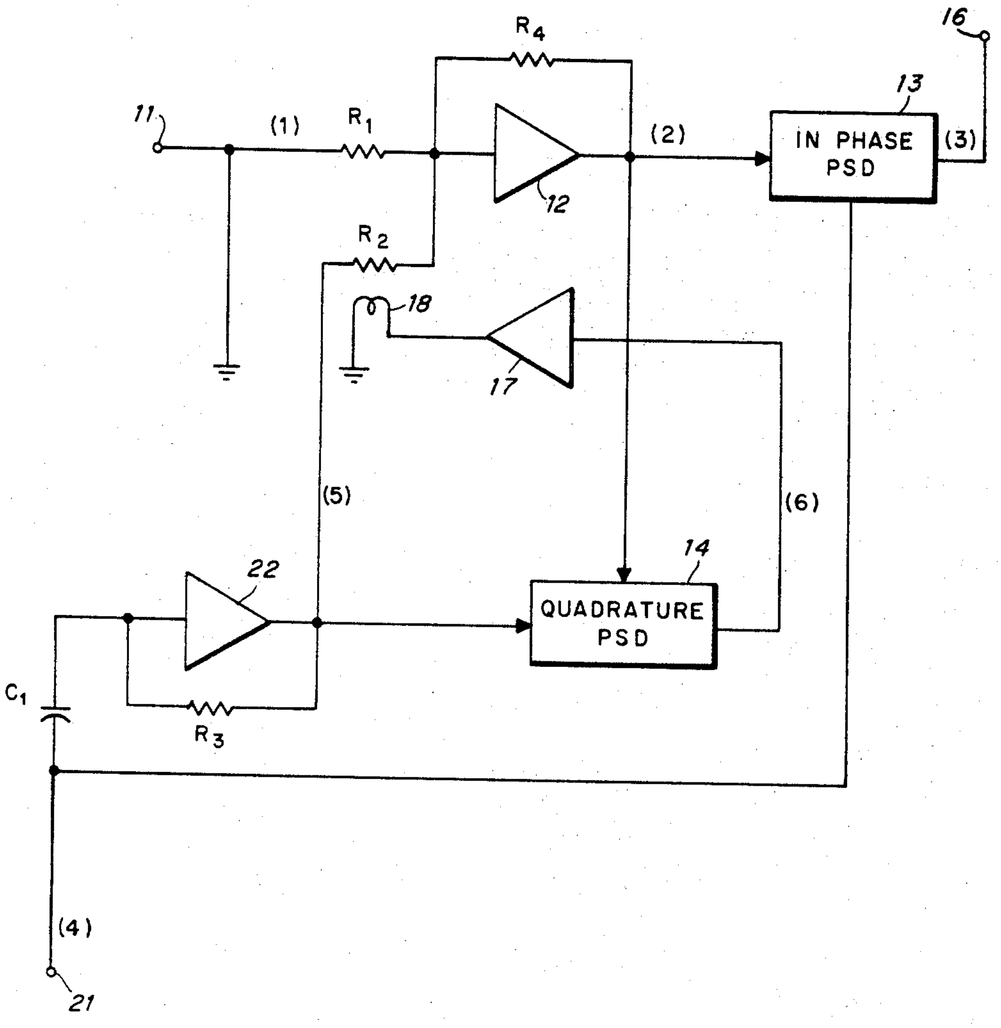
INVENTOR.
RICHARD L. KNOX United States Patent Office 3,414,823

Patented Dec. 3, 1968

3,414,823

PHASE SENSITIVE DEMODULATOR

Richard L. Knox, San Diego, Calif., assignor, by mesne assignments, to Honeywell Inc., Minneapolis, Minn., a corporation of Delaware Filed Jan. 7, 1965, Ser. No. 424,000
6 Claims. (Cl. 328—133)

ABSTRACT OF THE DISCLOSURE

A phase sensitive demodulator is provided which includes phase sensitive detectors and amplifiers connected thereto in order to eliminate an unwanted signal portion.

This invention relates to a phase sensitive demodulator and mroe particularly to a phase sensitive demodulator utilizing cancellation techniques of quadrature components of an input signal.

The general purpose of a phase sensitive demodulator is to separate a complex wave form comprising in phase and quadrature components (since and cosine components) of the same frequency into a DC voltage proportional to one or both of the components. This has generally been accomplished by the use of a phase sensitive detector in which a reference phase is interjected along with the signal of interest to yield a DC output proportional to the amplitude of that portion of the input signal which is in phase with the reference signal. These phase sensitive detectors are always plagued by some phase error due to tolerance limitations, and the like. The output error, however, is always proportional to the amplitude of the unwanted or quadrature component of the incoming signal.

According to the invention, an incoming complex signal is applied to one input of a phase sensitive detector, and a reference phase signal applied to another input of the phase sensitive detector. To reduce the amplitude of the quadrature signal and, thus, the error output of the phase sensitive detector, the reference phase is shifted by minus 90° or plus 270° and added to the incoming signal at the input of the phase sensitive detector. Hence, a portion of the quadrature or unwanted component of the incoming signal is cancelled before it reaches the phase sensitive detector. To control the amplitude of the shifted reference phase a feedback signal is applied which regulates the amount of the shifted reference phase applied to the incoming signal and thereby the amount of cancellation. This is accomplished by a second phase sensitive detector which has as its output a signal dependent upon the amplitude of the quadrature or unwanted component of the incoming signal present at the input of the first phase sensitive detector. The output of the second phase sensitive detector is then utilized to control the amplitude of the shifted reference phase to effect more perfect cancellation of the quadrature or unwanted component at the input of the system.

It is an object of the present invention to provide a phase sensitive demodulator with improved accuracy.

Another object is the provision of a phase sensitive demodulator which utilizes quadrature signal cancellation at its input.

A further object is the provision of a phase sensitive demodulator utilizing quadrature signal cancellation at its input with a unique quadrature component feedback system.

Yet another object of the inveniton is the provision of an improved phase sensitive demodulator utilizing conventional components.

A still further object is the provision of a phase sensitive demodulator which is simple, relatively inexpensive and requires a minimum of maintenance and adjustment.

Other objects and many of the attendant advantages of this invention will be readily appreciated as the same becomes better understood by reference to the following detailed description when considered in connection with the accompanying drawing which is a block diagram of the preferred embodiment of the invention.

Referring to the drawing, input terminal 11 is connected through resistance R1 to the input of amplifier 12. The output of amplifier 12 is connected to one input of in-phase phase sensitive detector 13 and to one input of quadrature-phase phase sensitive detector 14. The output of in-phase phase sensitive detector 13 is connected to output terminal 16 and the output of quadrature-phase phase sensitive detector 14 is connected to the input of amplifier 17. The output of amplifier 17 is connected through lamp 18 to ground.

Input terminal 21 is connected to another input of in-phase phase sensitive detector 13 and through capacitor C1 to the input of amplifier 22. The output of amplifier 22 is connected to another input of quadrature-phase phase sensitve detector 14 and through photosensitive resistance R2 to the input of amplifier 12. Resistance R4 is connected from the output of amplifier 12 back to its input. Resistance $R_3$ is connected in a feedback path around amplifier 22.

The following formulas represent the signal present where indicated on the diagram:

(1) $A \sin wt + B \cos wt$ (2) $\left[A \sin wt + \left(B - \frac{wR1R3C1}{R2}C\right) \cos wt\right]$ (3) D.C. (output—one cycle average)

(4) $C \sin wt$ (5) $-wC1R3C \cos wt$ (6) $B - \frac{wR1R3C1}{R2}C$ where:

A=Amplitude of in phase component of signal present at terminal 11.
B=Amplitude of quadrature component of signal present at terminal 11.
C=Amplitude of reference signal at terminal 21.
R1=R3.

OPERATION

In operation the signal applied at input terminal 11 is a complex signal having an in-phase component and a quadrature component as set out by Formula 1 above. This signal is applied at the input of amplifier 12 through a dividing and adding network comprising resistances R1 and R2. Simultaneously, a reference phase signal is applied at input terminal 21 which is represented by only an in-phase component set up by Equation 4 above. This signal is applied through a minus 90° or plus 270° phase shifting network comprising C1, R2 and amplifier 22. The output of this phase shifting network is applied through resistance R2 to the input of amplifier 12. This signal is then in antiphase or 180° out of phase with the quadrature component of the signal applied at input terminal 11 and is represented mathematically by Equation 5. Since this signal is added to the signal applied to input terminal 11 at the input of amplifier 12, the output of amplifier 12 is mathematically expressed by Equation 2 above and as is self-evident from the equation, represents some cancellation of the quadrature component. This signal is then applied as one signal input to phase sensitive detectors 13 and 14.

In-phase phase sensitive detector 13 also has applied the reference signal at input terminal 21 as one input, yielding an output at output terminal 16 which is a DC voltage proportional to the amplitude of the in-phase component of the signal applied at input terminal 11, and as shown mathematically by Equation 3 above.

The shifted reference phase signal is also applied as one input to quadrature-phase phase sensitive detector 14 which will yield a DC signal proportional to the amplitude of the quadrature component of the complex signal applied, shown by Equation 2. This signal, expressed by Equation 6 above, is amplified in amplifier 17 and applied to lamp 18. Lamp 18 is located in physical proximity to resistor R2 which is a photosensitive resistor. Hence, the amount of quadrature signal present at the output of amplifier 12 determines the brilliance of lamp 18 which in turn determines the resistance of resistor R2. This, of course, determines the amplitude of the shifted reference phase signal at the output of amplifier 22 which is applied as a quadrature component cancelling signal to the complex signal of interest from input terminal 11.

The overall accuracy of phase sensitive detector 13 as seen at output terminal 16 is increased because of the reduction of the quadrature component applied to its input due to the cancelling of the quadrature component at the input of amplifier 12. As stated above, the accuracy of any phase sensitive demodulator is proportional to the amplitude of the unwanted or quadrature component at its input.

While the invention has been described, it should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

What is claimed is:

1. A phase sensitive demodulator for removing a quadrature component of a complex signal comprising:
- a phase sensitive detector having a signal input adapted for connection to a source of complex signals, a reference input and an output;
- a reference signal directly connected to said phase sensitive detector reference input;
- phase shifting means having an input connected to said reference signal and an output connected to said phase sensitive detector signal input for shifting said reference signal to a phase for cancelling any quadrature component present at said phase sensitive detector signal input; and
- amplitude control means coupled to said phase-shifting means output for controlling the amplitude of said phase shifted reference signal, said amplitude control means comprising a variable voltage divider having a feedback control means;
- said feedback control means including a second phase sensitive detector having a signal input, a reference input and an output;
- said signal input connected to the first mentioned phase sensitive detector signal input, said reference input of said second phase sensitive detector connected to said phase shifting means output; and
- said output of said second phase sensitive detector coupled to said variable voltage divider.

2. The phase sensitive demodulator of claim 1 wherein said variable voltage divider includes a photosensitive resistor and the second phase sensitive detector output is connected to a light source in physical proximity to said photosensitive resistor.

3. In combination, first and second phase sensitive detectors, input signal supplying means, reference signal supplying means, said reference signal supplying means connected to each of said first and second phase sensitive detectors, said first phase sensitive detector being connected directly to said reference signal supplying means, said input signal supplying means connected to each of said first and second phase sensitive detectors, and control means connected to receive output signals from said second phase sensitive detector to control the form of only the input signals supplied to said phase sensitive detectors as a function of the reference signal supplied by said reference signal supplying means.

4. The combination recited in claim 3 wherein said phase sensitive detectors exhibit a quadrature relationship, and includes phase shifting means connected between said reference signal supplying means and said second phase sensitive detector.

5. The combination recited in claim 4 including summing means connected between said input signal supplying means and said first phase sensitive detector, and said control means includes means connected from said phase shifting means to said summing means thereby cancelling a portion of the signal supplied by said input signal supplying means.

6. The combination recited in claim 5 wherein said last named means includes variable impedance means, said control means further including means for varying the impedance of said variable impedance means to effect the cancellation of predetermined portions of said input signal.

References Cited

UNITED STATES PATENTS

| | | | |
|---|---|---|---|
| 3,238,450 | 3/1966 | Palmer | 329—112 X |
| 2,902,649 | 9/1959 | Bachmann | 329—137 X |
| 3,278,847 | 10/1966 | Widenor | 307—88.5 X |

ARTHUR GAUSS, *Primary Examiner.*

J. D. FREW, *Assistant Examiner.*